(12) United States Patent
Reed

(10) Patent No.: US 9,541,008 B2
(45) Date of Patent: Jan. 10, 2017

(54) METHOD AND APPARATUS TO CONTROL PART-LOAD PERFORMANCE OF A TURBINE

(75) Inventor: Robert Joseph Reed, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 897 days.

(21) Appl. No.: 13/366,649

(22) Filed: Feb. 6, 2012

(65) Prior Publication Data

US 2013/0199153 A1 Aug. 8, 2013

(51) Int. Cl.
| F02C 9/18 | (2006.01) |
| F01D 11/24 | (2006.01) |
| F01D 9/06 | (2006.01) |
| F01D 5/18 | (2006.01) |

(52) U.S. Cl.
CPC .......... F02C 9/18 (2013.01); F01D 11/24 (2013.01); *F01D 5/187* (2013.01); *F01D 9/065* (2013.01)

(58) Field of Classification Search
CPC ........... F02K 3/105; F02K 3/115; F02K 3/08; F02K 3/00; F02C 9/18; F02C 1/06; F02C 6/003; F02C 6/08; F02C 3/16; F02C 3/365; F02C 7/10; F02C 7/105; F02C 9/28; F02C 9/52; F02C 3/13; F28D 21/001; F01D 11/14; F01D 11/20; F01D 11/24; F01D 5/187; F01D 9/065
USPC ..... 60/266, 267, 782–785, 262, 39.511, 204, 60/795, 652
See application file for complete search history.

(56) References Cited

U.S. PATENT DOCUMENTS

| 2,994,472 | A | * | 8/1961 | Botje | F01D 11/24 415/113 |
| 4,179,880 | A | * | 12/1979 | Schirmer | 60/39.23 |
| 4,596,116 | A | * | 6/1986 | Mandet | F01D 11/08 415/173.2 |
| 4,631,914 | A | * | 12/1986 | Hines | 60/775 |
| 4,844,688 | A | * | 7/1989 | Clough | F01D 11/24 415/113 |
| 4,928,240 | A | * | 5/1990 | Davison | F01D 11/24 415/116 |
| 5,048,288 | A | * | 9/1991 | Bessette | F01D 11/24 415/116 |
| 5,351,732 | A | * | 10/1994 | Mills | F01D 11/24 415/115 |
| 6,152,685 | A | * | 11/2000 | Hagi | F01D 11/24 415/116 |
| 6,253,554 | B1 | | 7/2001 | Kobayashi et al. | |
| 6,389,793 | B1 | * | 5/2002 | Priestley | 60/782 |
| 6,550,253 | B2 | * | 4/2003 | Mortzheim et al. | 60/782 |

(Continued)

FOREIGN PATENT DOCUMENTS

| CN | 86101144 A | 8/1986 |
| CN | 101498242 A | 5/2009 |
| CN | 102112704 A | 6/2011 |

*Primary Examiner* — Gerald L Sung
*Assistant Examiner* — Alain Chau
(74) *Attorney, Agent, or Firm* — Dority & Manning, PA

(57) ABSTRACT

A method of controlling the part-load performance of a turbine includes generating a bypass flow in the turbine by removing a portion of a compressed fluid from a compressor of the turbine, determining an operating load of the turbine, transmitting the bypass flow to a turbine section of the turbine; and selectively heating the bypass flow according to the determined operating load of the turbine.

17 Claims, 5 Drawing Sheets

(56) References Cited

U.S. PATENT DOCUMENTS

| | | | |
|---|---|---|---|
| 6,792,762 B1 | 9/2004 | Yamanaka et al. | |
| 7,096,673 B2* | 8/2006 | Little | F01D 5/081 60/782 |
| 7,254,937 B2* | 8/2007 | Hull et al. | 60/266 |
| 7,698,898 B2* | 4/2010 | Eluripati et al. | 60/785 |
| 2005/0109016 A1* | 5/2005 | Ullyott | F01D 11/24 60/282 |
| 2005/0126181 A1* | 6/2005 | Wilson | F01D 11/24 60/785 |
| 2008/0112797 A1* | 5/2008 | Seitzer | F01D 11/24 415/116 |
| 2008/0112798 A1* | 5/2008 | Seitzer | F01D 11/24 415/144 |
| 2009/0193812 A1* | 8/2009 | Kirzhner | 60/783 |
| 2010/0175387 A1* | 7/2010 | Foust | F01D 9/023 60/782 |
| 2010/0251727 A1* | 10/2010 | Myers | F01K 13/02 60/773 |
| 2010/0263350 A1 | 10/2010 | Liu et al. | |
| 2011/0088405 A1* | 4/2011 | Turco | F01D 5/081 60/782 |
| 2011/0138818 A1* | 6/2011 | Mizukami et al. | 60/778 |
| 2012/0167584 A1* | 7/2012 | Philippot | F01D 11/24 60/778 |
| 2013/0104564 A1* | 5/2013 | Arar | 60/782 |
| 2013/0111919 A1* | 5/2013 | Chehab | F01D 11/24 60/778 |
| 2013/0149123 A1* | 6/2013 | Laurello | F01D 11/24 415/191 |
| 2013/0167551 A1* | 7/2013 | Subramaniyan et al. | 60/795 |

\* cited by examiner

_METHOD AND APPARATUS TO CONTROL PART-LOAD PERFORMANCE OF A TURBINE_

BACKGROUND OF THE INVENTION

The subject matter disclosed herein relates to a turbine, such as a gas turbine.

A gas turbine is designed to operate at a peak load or base load. The turbine has a compressor, to take in a fluid and compress the fluid, a combustion section to combust a fuel to heat the fluid, and a turbine section to generate power with the heated fluid. When the turbine operates at peak load, the turbine operates at a predetermined combustion level to drive a turbine section. However, when the turbine is operated off-peak, or at part-load, the efficiency of the turbine decreases.

BRIEF DESCRIPTION OF THE INVENTION

According to one aspect of the invention, a turbine includes a compressor to intake a fluid and compress the fluid, a combustion section to combust a fuel to generate heated fluid by heating the fluid from the compressor, a turbine section to convert the heated fluid to work, an exhaust to output the heated fluid from the turbine section, and a bypass circuit to generate a bypass flow by taking in compressed fluid from the compressor, to heat the bypass flow with the heated fluid from the exhaust, and to output the heated bypass flow to the turbine section.

According to another aspect of the invention, a power generation system comprises: a turbine having a compressor to take in and compress a fluid, a combustion section to heat the fluid from the compressor, a turbine section to drive a shaft with the heated fluid from the combustion section, an exhaust section to eject the heated fluid from the turbine section, and bypass circuit to generate a bypass flow by taking in a portion of the compressed fluid from the compressor and selectively directing the bypass flow to the turbine section and the exhaust section; and a turbine control unit to determine an operating mode of the turbine among a peak mode and a part-load mode, and to control the bypass circuit to transmit the bypass flow to one of the turbine section and the exhaust section according to the determined operating mode.

According to yet another aspect of the invention, a method to control part-load performance of a turbine comprises generating a bypass flow in a turbine by removing a portion of a compressed fluid from a compressor of the turbine; determining an operating load of the turbine; transmitting the bypass flow to a turbine section of the turbine; and selectively heating the bypass flow according to the determined operating load of the turbine.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
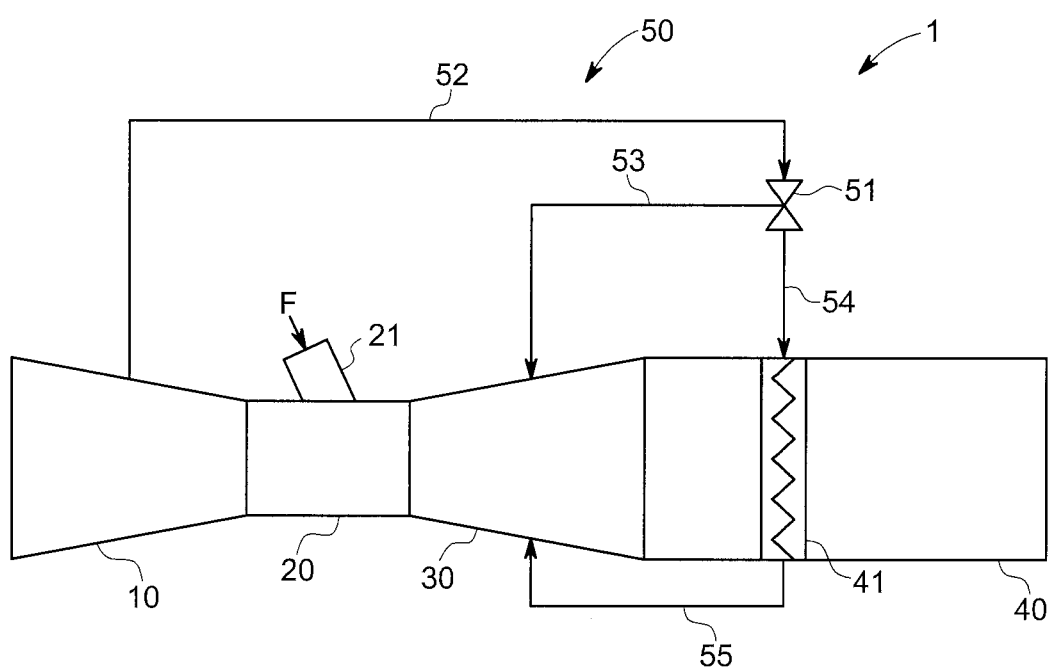
FIG. 1 illustrates a turbine according to one aspect of the invention.

FIG. 1 illustrates a turbine 1 according to an embodiment of the invention. The turbine 1 includes an intake section, or compressor, 10, a combustion section 20, a turbine section 30, and an exhaust section 40. The compressor 10 intakes a fluid and compress the fluid before transmitting the fluid to the combustion section 20. According to the present embodiment, the fluid is air, and the compressor 10 comprises a plurality of stages, each stage including an annular ring of blades rotating about a shaft and a subsequent annular ring of vanes.

The combustion section 20 receives the compressed air and heats the compressed air by combusting fuel F in a combustion chamber 21. The heated compressed air is transmitted to the turbine section 30, where it drives a rotor including buckets rotating about a shaft, and the rotating shaft generates power.

The exhaust section 40 receives the heated air from the turbine 30 and outputs the heated air.

In the present embodiment of the invention, the turbine 1 also includes a bypass circuit 50. The bypass circuit 50 includes a conduit 52 to transmit air from the compressor 10 to a valve 51, a conduit 53 to transmit air to the turbine from the valve 51, and a conduit 54 to transmit air to the exhaust section 40 from the valve 51. In addition, a conduit 55 transmits air from the exhaust section 40 to the turbine section 30.

The exhaust section 40 includes a heat exchanger 41 to heat the air from the conduit 54. The heated air is then transmitted via the conduit 55 to the turbine section 30.

During peak operation or base-load operation, the valve 51 closes airflow to the conduit 54 and allows airflow from conduit 52 to conduit 53. Thus, relatively cool air is provided to the turbine section 30 to cool components of the turbine section, such as a shaft, buckets, and nozzles. However, when cool air is provided to the turbine section 30 during part-load operation, efficiency of the turbine 1 decreases.

Accordingly, during part-load operation, the valve 51 closes airflow to the conduit 53 and allows airflow through the conduit 54 to the exhaust section 40. The air flows through the heat exchanger 41 of the exhaust section 40 and through the conduit 55 from the exhaust section 40 to the turbine section 30. Consequently, the air that flows from the heat exchanger 41 through the conduit 55 to the turbine section 30 is heated, thereby increasing the efficiency of the turbine section by reducing heat loss of the air from the combustion section 20 to the turbine section 30.

In other words, according to the present embodiment of the invention, the components of the turbine section 30 are cooled by the bypass circuit 50 during peak-load operation to prevent overheating of the components while relatively high temperatures are output to the turbine section 30 from the combustion section 20. However, during part-load operation, in which temperatures output from the combustion section 20 to the turbine section 30 are low relative to peak-load operation, the bypass circuit 50 provides heated air to the turbine section 30 to reduce heat-loss of the air provided from the combustion section 20. Consequently, dual objectives of cooling components during peak-load operation and increasing efficiency during part-load operation are met.

Figure 2:
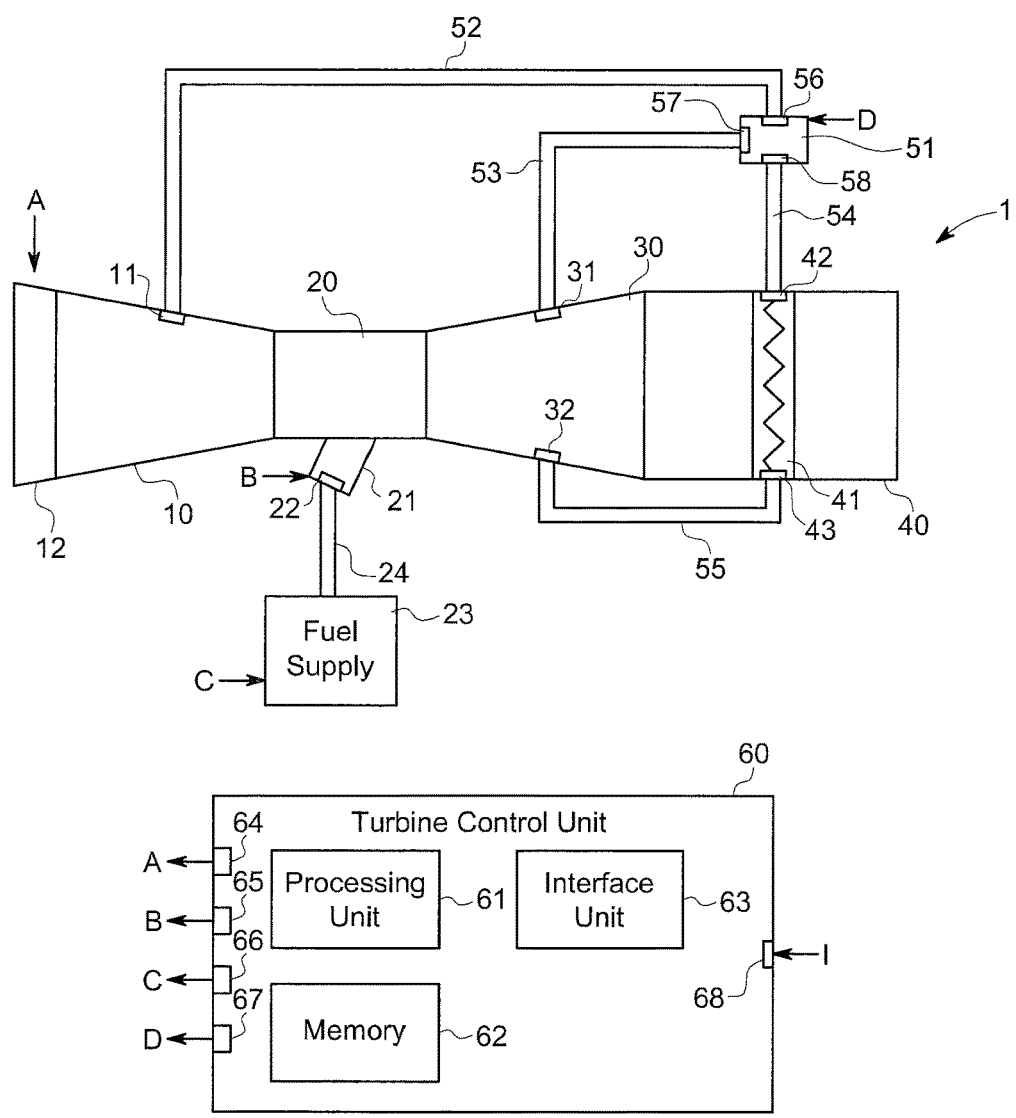
FIG. 2 illustrates the turbine and a turbine control unit.

FIG. 2 illustrates a turbine control system. The turbine control system includes the turbine 1 and a turbine control unit 60. The turbine control unit 60 includes, for example, a processing unit 61, memory 62, and an interface unit 63. The turbine control unit 60 receives input data I via a terminal 68, and outputs control signals A, B, C, and D via terminals 64, 65, 66, and 67.

During operation, the turbine control unit 60 receives instructions or commands to operate the turbine 1 at part-load. The instructions are input to the interface unit 63, which includes at least one of a wired port and a wireless port or antenna. The interface unit 63 transmits the instructions I to the processing unit 61. The processing unit 61 determines whether the instructions I correspond to a part-load operation and controls the control signals A-D accordingly. According to one embodiment, the processing unit 61 compares a level of load in the instructions I with a predetermined level stored in memory 62 to determine whether the instructions I correspond to part-load operation.

For example, the control signal A adjusts an air intake of the compressor 10 by adjusting characteristics of an intake control device 12. In the present embodiment, the intake control device 12 is one of vanes having adjustable openings between adjacent vanes and a fan. Control signal B controls the inlet 22 of the combustion chamber 21 to reduce fuel input to the combustion chamber 21 in part-load operation. Control signal C adjusts fuel supplied from a fuel supply 23 to the combustion chamber 21 via the conduit 24. Control signal D controls the valve 51 to close the outlet 57, and to open the outlet 58, in part-load operation.

During peak-load operation, the bypass circuit 50 takes in air from the compressor 10 via the outlet 11. The air enters the valve 51 via the inlet 56 and exits the valve 51 via the outlet 57. The relatively cool air travels through the conduit 53 and enters the turbine section 30 via the inlet 31. During off-peak or part-load operation, the relatively cool air exits the valve 51 via the outlet 58, travels through the conduit 54, and enters the heat exchanger 41 of the exhaust section 40 via the inlet 42. The heated air exits the exhaust section 40 via the outlet 43, travels through the conduit 55, and enters the turbine section 30 via the inlet 32.

FIG. 2 illustrates conduits 53 and 55 connected to opposite sides of the turbine section 30 for clarity and for purposes of illustration. However, according to some embodiments the conduits 53 and 55 each introduce air into the turbine section 30 at a plurality of locations around the turbine section.

Figure 3:
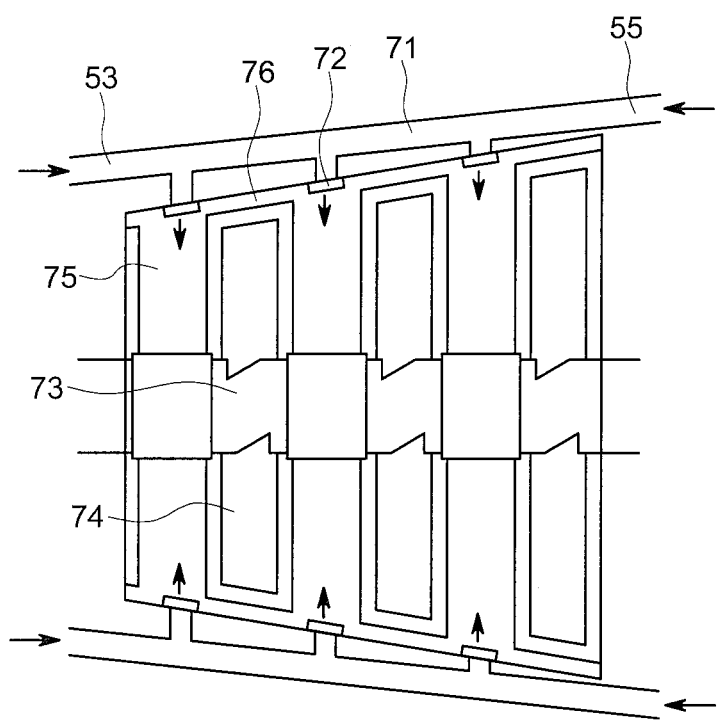
FIG. 3 illustrates a turbine section according to an embodiment of the invention.

While FIG. 2 illustrates separate conduits 53 and 55 connected to separate inlets 31 and 32, according to some embodiments, the conduits 53 and 55 are connected to each other. FIG. 3 illustrates an example of the conduits 53 and 55 connected to each other to introduce air into the same inlets. As illustrated in FIG. 3, each of the conduits 53 and 55 is connected to a connection conduit 71, which feeds to the inlets 72 in the casing 76 of the turbine section 30. The inlets 72 correspond to the inlets 31 and 32 of FIG. 2. The turbine section 30 comprises a shaft 73 having buckets 74 that rotate around the shaft 73, and nozzles comprising vanes 75 with openings between the vanes 75 to direct air from a direction of the combustion section 20 onto the buckets 74 to drive the shaft 73. In the present embodiment, the inlets 72 are located at positions corresponding to the vanes 75. The air from the bypass circuit 50, represented by arrows into the turbine section 30, flows into the inlets 72, down the length of the vanes 75 in tubes located within the vanes 75, out of the vanes 75 in the vicinity of the shaft 73, and into the space between the vanes 75 and the buckets 74.

While FIG. 3 illustrates the conduits 53 and 55 connected to the connection conduit 71, according to alternative embodiments, the conduits 53 and 55 are connected to separate inlets corresponding to each vane 75. In other embodiments, the conduits 53 and 55 are connected to alternating vanes 75.

Figure 4:
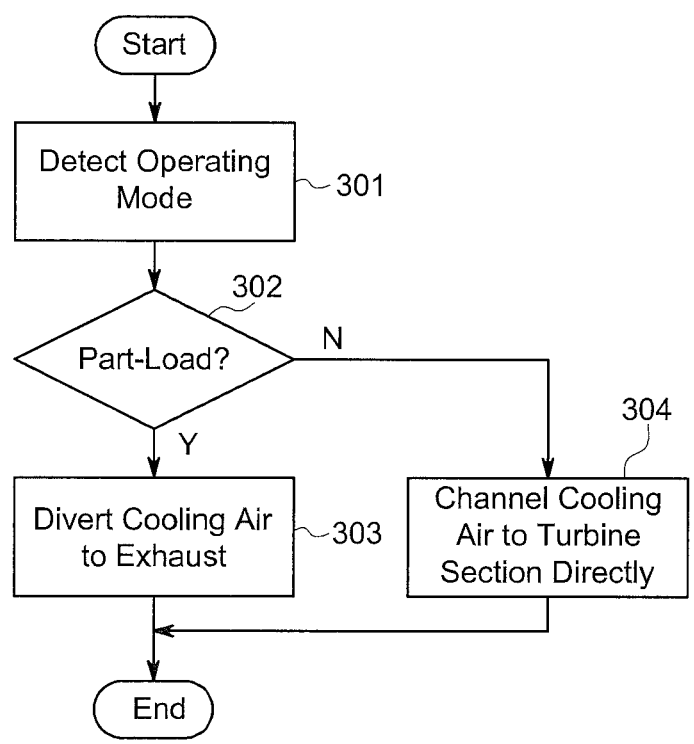
FIG. 4 is a flow chart to illustrate a control operation of the turbine.

FIG. 4 is a flow diagram illustrating a control operation of the turbine 1. In operation 301, an operation mode is detected. The turbine control unit 60 receives an input instruction or command Ito operate the turbine 1 at a predetermined load. If it is determined in operation 302 that the turbine 1 is operating at peak-load, then air from the compressor 10 in the bypass circuit 50, or a bypass flow, is channeled directly to the turbine section 30, bypassing the exhaust section 40. In such a case, the turbine control unit 60 outputs control signals B-D to provide peak-load levels of fuel to the combustion chamber 21, to close the outlet 58 from the bypass valve 51 to the exhaust section 40, and to open the outlet 57 from the bypass valve 51 to the turbine section 30. In addition, according to some embodiments, the turbine control unit 60 controls the level of intake air to a peak-load level by controlling the intake control device 12 with control signal A.

If it is determined in operation 302 that the turbine 1 is operating at part-load, the bypass flow from the compressor 10 is diverted through the heat exchanger 41 of the exhaust section 40 to heat the bypass flow. The turbine control section 60 detects that the instruction I is to operate the turbine 1 at part-load, and adjusts control signals B-D to reduce the fuel provided to the combustion chamber 21, to close the outlet 57 from the bypass valve 51, and to open the outlet 58 from the bypass valve 51. The bypass flow from the bypass valve 51 flows through the conduit 54 to the heat exchanger 41, and the heated bypass flow is returned to the turbine section 30 via the conduit 55.

Accordingly, during peak-load operation, a cooling bypass flow is applied to a turbine section 30 to maintain within a predetermined range a temperature of the components of the turbine section 30, and during part-load operation, the cooling bypass flow is heated and supplied to the turbine section 30 to improve operating efficiency of the turbine 1.

Figure 5:
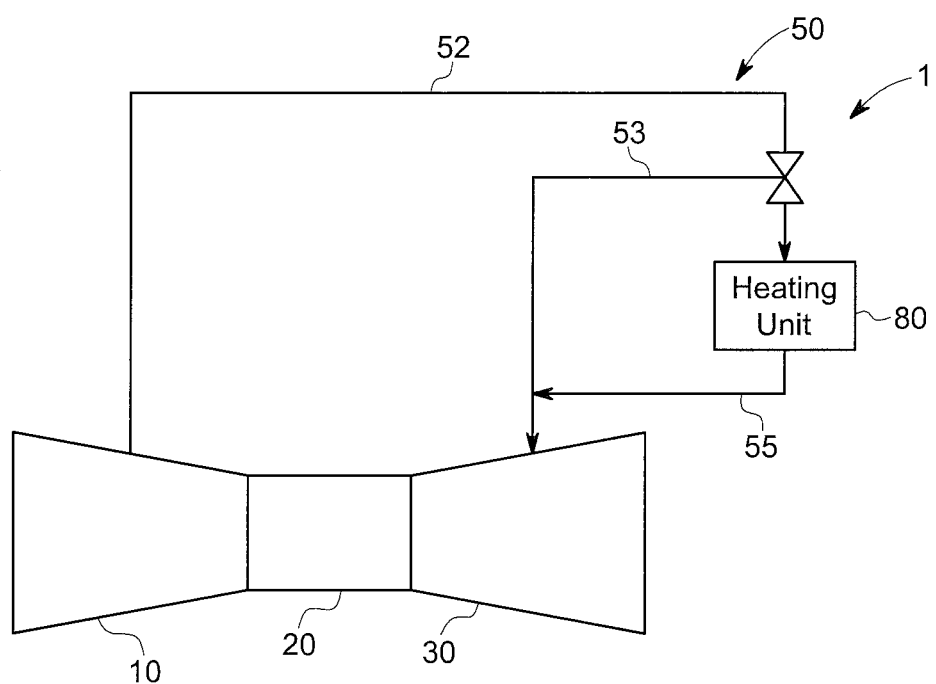
FIG. 5 illustrates a turbine according to an embodiment of the invention.

While the embodiments above have described the bypass flow as being heated by the exhaust section 40, according to alternative embodiments, any heating source may be used to heat the exhaust. FIG. 5 illustrates a turbine 1 in which the bypass circuit 50 selectively transmits the bypass flow through a heating unit 80. The heating unit 80 includes any one of the exhaust 40, a steam source, a heat exchanger, and a fuel combustion unit, for example.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A turbine, comprising:
   a compressor to intake a fluid and compress the fluid;
   a combustion section to combust a fuel to generate heated fluid by heating the fluid from the compressor;
   a turbine section to convert the heated fluid to work, wherein the turbine section receives heated compressed air directly from the combustion section; and
   a bypass circuit to generate a bypass flow by taking in compressed fluid from the compressor, the bypass circuit including:
      a valve to direct the bypass flow to a heat exchanger to heat the bypass flow and from the heat exchanger directly to the turbine section according to one operation mode of the turbine, and to direct the bypass flow directly to the turbine in another operation mode of the turbine, wherein the bypass flow flows from a portion of the compressor between a compressor inlet and a compressor outlet directly to the valve;
      a first conduit to transmit the bypass flow from the compressor to the valve;
      a second conduit to transmit the bypass flow from the valve to a first inlet on the turbine section, the first inlet being coupled to a first vane;
      a third conduit to transmit the bypass flow from the valve to the heat exchanger;
      a fourth conduit to transmit the bypass flow from the heat exchanger to a second inlet on the turbine section, the second inlet being coupled to a second vane; and
      wherein the second and fourth conduits are connected to each other by a connection conduit extending axially along the turbine section, and the first and second inlets are located along the connection conduit.

2. The turbine of claim 1, wherein the bypass circuit heats the bypass flow when the turbine operates in a part-load mode, and the bypass circuit does not heat the bypass flow when the turbine operates in a peak-load mode.

3. The turbine of claim 1, further comprising:
   an exhaust section to output the heated fluid from the turbine section,
   wherein the bypass circuit heats the bypass flow by passing the bypass flow through the heat exchanger in the exhaust section.

4. The turbine of claim 3, wherein the valve selectively outputs the bypass flow from the compressor to one of the exhaust section and the turbine section.

5. The turbine of claim 4, wherein the valve outputs the bypass flow to the exhaust section when the turbine operates in a part-load mode, and the valve outputs the bypass flow to the turbine section when the turbine operates in a peak-load mode.

6. The turbine of claim 3, wherein the exhaust section includes an inlet to transmit the bypass flow from the valve to the heat exchanger, and an outlet to transmit the bypass flow from the heat exchanger to the turbine section.

7. The turbine of claim 1, wherein the turbine section includes a plurality of vanes to direct the heated fluid to a plurality of annular stages of buckets, and the bypass circuit outputs the bypass flow to the plurality of vanes of the turbine section.

8. A power generation system, comprising:
   a compressor section having a compressor to take in and compress a fluid, a combustion section to heat the fluid from the compressor, a turbine section that receives fluid directly from the combustion section to drive a shaft with the fluid heated by the combustion section, an exhaust section to eject the fluid from the turbine section, a bypass circuit to generate a bypass flow by taking in a portion of the fluid compressed by the compressor, and a valve to direct the bypass flow to a heat exchanger to heat the bypass flow and from the heat exchanger directly to a second inlet on the turbine section according to one operation mode of the turbine, the second inlet being coupled to a second vane, and to direct the bypass flow directly to a first inlet on the turbine in another operation mode of the turbine, the first inlet being coupled to a first vane, wherein the bypass flow flows from a portion of the compressor between a compressor inlet and a compressor outlet directly to the valve;
   wherein the first and second inlets are located along a connection conduit that extends axially along the turbine section; and
   a turbine control unit to determine an operating mode of the turbine, and to control the bypass circuit to transmit the bypass flow to one of the turbine section and the heat exchanger according to a determined operating mode.

9. The power generation system of claim 8, wherein the turbine control unit controls the bypass circuit of the turbine to transmit the bypass flow directly to the turbine section when the turbine operates in a peak-load operating mode, and to transmit the bypass flow to the heat exchanger when the turbine operates in a part-load operating mode.

10. The power generation system of claim 9, wherein the turbine control unit receives an input instruction to operate the turbine at a predetermined operating mode, analyzes the input instruction to determine the operating mode of the turbine, and outputs control signals to control a level of combustion in the combustion section and to transmit the bypass flow directly to the turbine section when the turbine operates in the peak-load operating mode, and to transmit the bypass flow to the heat exchanger when the turbine operates in the part-load operating mode.

11. The power generation system of claim 8, wherein the bypass circuit of the turbine includes a conduit from the exhaust section to the turbine section to direct the bypass flow from the exhaust section to the turbine section.

12. The power generation system of claim 8, wherein the exhaust section of the turbine includes the heat exchanger.

13. A method to control part-load performance of a turbine, the method comprising:
   generating a bypass flow in a turbine by removing a portion of a compressed fluid from a compressor of the turbine;
   determining an operating load of the turbine;
   transmitting the bypass flow to a heat exchanger to heat the bypass flow and from the heat exchanger directly to a second inlet on a turbine section according to one operation mode of the turbine, the second inlet being coupled to a second vane; and
   transmitting the bypass flow to a first inlet on the turbine section of the turbine, the turbine section receiving heated compressed air directly from a combustion section according to another operation mode of the turbine, the first inlet being coupled to a first vane;

wherein the first and second inlets are located along a connection conduit that extends axially along the turbine section; and wherein the bypass flow flows from a portion of the compressor between a compressor inlet and a compressor outlet directly to a valve that directs the bypass flow to either the heat exchanger or directly to the turbine section.

14. The method of claim 13, wherein when it is determined that the turbine operates at peak-load, the bypass flow is transmitted directly to the turbine section, and when it is determined that the turbine operates at part-load, the bypass flow is heated before being transmitted to the turbine section.

15. The method of claim 14, wherein the heat exchanger is in an exhaust section of the turbine and heats the bypass flow when it is determined that the turbine operates at part-load.

16. The method of claim 13, wherein selectively heating the bypass flow includes controlling a valve to close a conduit to an exhaust section of the turbine when the bypass flow is not heated, and to close a conduit to the turbine section when the bypass flow is heated.

17. The method of claim 13, wherein determining the operating load of the turbine comprises:

receiving an instruction to operate the turbine at a predetermined operating load; and analyzing the instruction to determine the operating load of the turbine.

\* \* \* \* \*